I. A. MILLIRON.
TRANSPORTING RECEPTACLE FOR EGGS AND SIMILAR ARTICLES.
APPLICATION FILED NOV. 19, 1913.
1,165,110.
Patented Dec. 21, 1915.
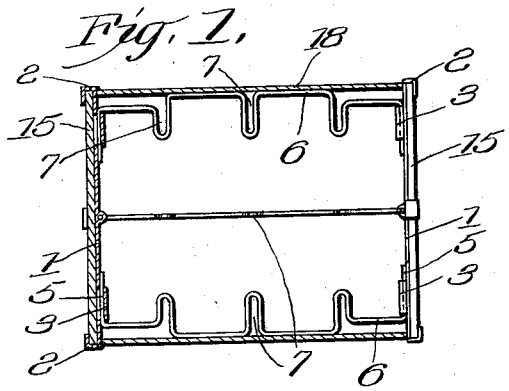
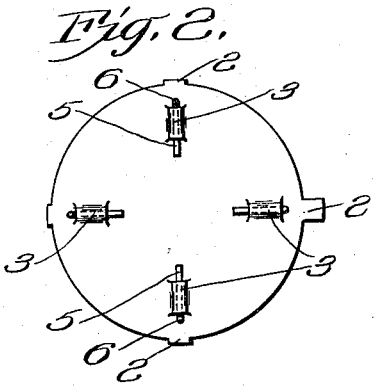
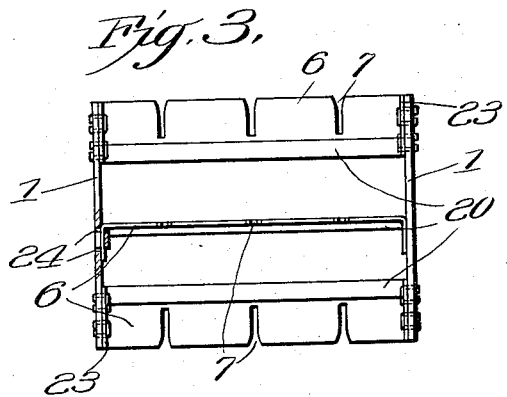
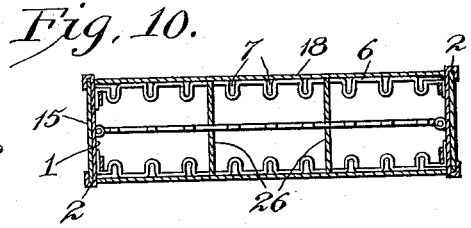
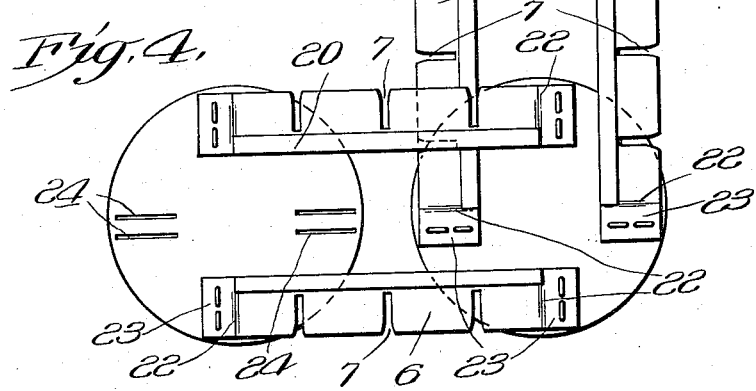
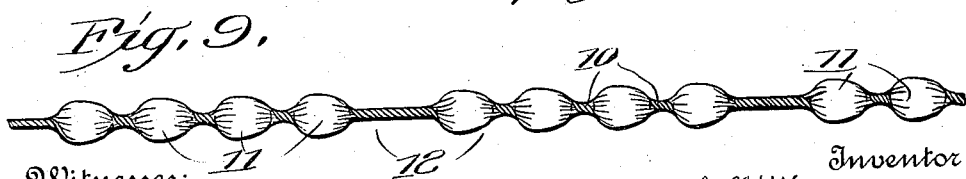
Inventor
Ira A. Milliron
By his Attorney
Alfred Wilkinson I. A. MILLIRON.
TRANSPORTING RECEPTACLE FOR EGGS AND SIMILAR ARTICLES.
APPLICATION FILED NOV. 19, 1913.
1,165,110.
Patented Dec. 21, 1915.
2 SHEETS—SHEET 2.
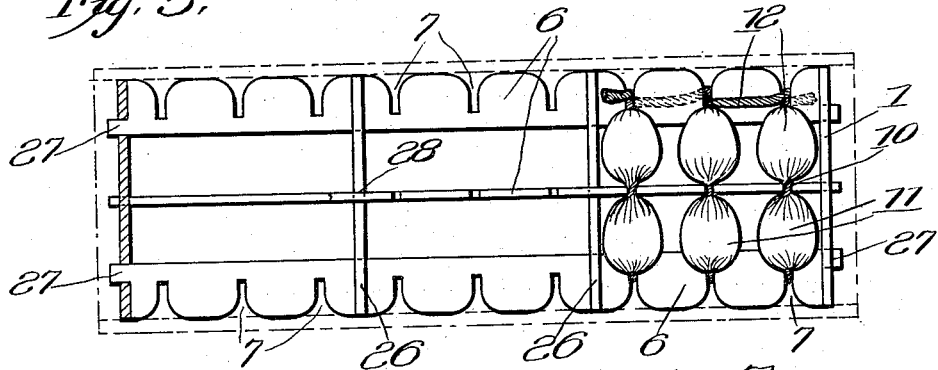
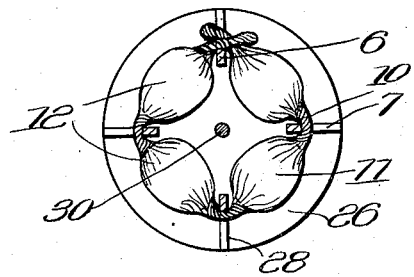
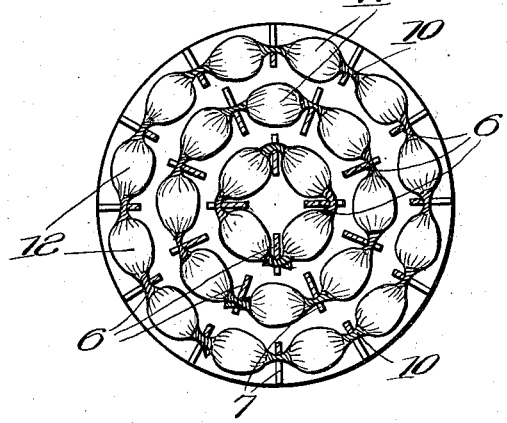
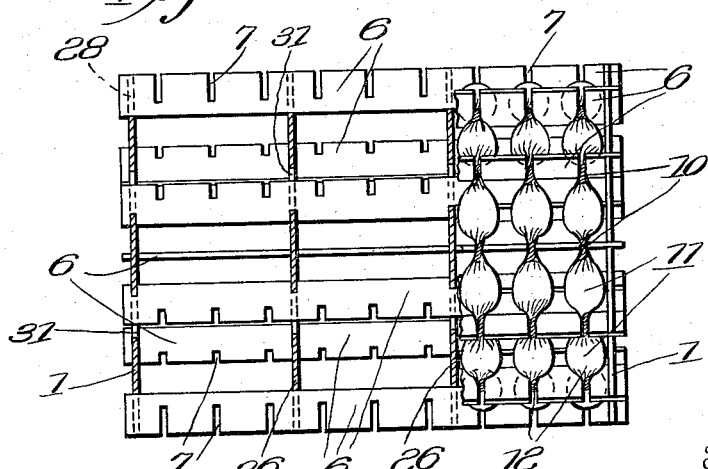

UNITED STATES PATENT OFFICE.

IRA A. MILLIRON, OF NEW YORK, N. Y., ASSIGNOR TO HAMMOCK EGG CARRIER COMPANY, A CORPORATION OF WEST VIRGINIA.

TRANSPORTING-RECEPTACLE FOR EGGS AND SIMILAR ARTICLES.

1,165,110.  Specification of Letters Patent.  Patented Dec. 21, 1915.

Application filed November 19, 1913. Serial No. 801,845.

*To all whom it may concern:*

Be it known that I, IRA A. MILLIRON, a citizen of the United States, residing at New York, in the county of New York and State of New York, have invented new and useful Improvements in Transporting-Receptacles for Eggs and Similar Articles, of which the following is a specification.

My invention relates to a receptacle for eggs and similar articles, in which the eggs may be packed easily and compactly and protected from practically all danger of breakage during transportation.

The important features of my invention are a carrier or container comprising a suitable frame provided with supports radiating from a main axis to receive and sustain the eggs inclosed in a suitable envelop. This envelop consists of a strip of paper, cloth or other suitable yielding material in which a series of eggs, longitudinally arranged, are wrapped and secured by twisting the envelop at each end and between the eggs, forming, so to speak, a "rope" of eggs. This rope is coiled around the frame with the twisted portions received and retained by the supports, so that the coils of the rope extend, and the eggs are arranged, transversely to the axis. Several eggs are thus arranged in each transverse tier. To that end the supports must be firmly sustained and arranged at a suitable distance from the axis; they must also be equally spaced around the circumference of the container and spaced a little more than the length of a large egg, to receive between adjacent supports an egg plus twisted portions of the envelop at each end of the egg. The envelop and container make up the complete receptacle in which the eggs are firmly and safely supported, each in its own "hammock", and, being transversely arranged, are packed most compactly in a container of convenient length and size.

My container may be much varied in form but a desirable construction is here shown, substantially cylindrical, comprising two heads and a series of supporting elements, or strips, extending between the heads, and provided on their outer edges with notches, depressions, or other suitable seats, to receive the twisted portions of the envelop, the eggs being supported in the space between the strips. These strips are arranged parallel to the axis, and are equally spaced and sufficiently spaced to receive between them the eggs as above stated. The strips may be formed of strong wire, wood or heavy cardboard to produce a strong container, but the supporting strips may be light and supplementary stiffening means employed.

My invention is fully illustrated in the drawing herewith in which similar reference numerals indicate similar parts in the various figures.

Figures 1 and 2 are respectively longitudinal and cross sections of a desirable form of the container, in which the heads are of thin metal and the longitudinal strips of wire. Fig. 3 is a longitudinal section of a modified form in which the heads are of cardboard, or thin board, and the strips of paper or thinner carboard suitably reinforced. Fig. 4 is a plan of the preceding in knocked down position. Figs. 5 and 6 are respectively longitudinal and cross-sections of modified and elongated form adapted to contain three dozen eggs. Figs. 7 and 8 are corresponding views showing a still further enlarged form to receive eighteen dozen eggs. Fig. 9 shows a "rope" of eggs, illustrating the irregular spacing to adapt the eggs to be coiled around the supporting strips. Fig. 10 is a longitudinal sectional view of an enlarged container of the form of Fig. 1, showing the use of partitions.

In Figs. 1 and 2 is illustrated a small size of container adapted to receive one dozen eggs. 1, 1 indicate the circular thin metal heads, having the lugs or ears 2 and the struck up loops 3 in which are inserted the bent ends 5 of the wire strips 6 corrugated as shown to provide notches or depressions 7, forming seats to receive and hold the twisted portions 10 between the inclosed eggs 11 of the rope 12, as best shown in Figs. 5 and 6. The notches of the different strips are in alinement and so spaced that the eggs, even of the largest size, are maintained out of contact with each other. By means of these corrugations the wire strips are also flattened or widened in a radial direction with relation to the main axis of the container, so that they firmly support the head and stiffen the whole structure.

Further to reinforce the heads, disks 15 of thin board or of sufficiently heavy cardboard may be introduced within or arranged outside against the outer surfaces of the heads and the lugs bent outwardly to hold them in place. As shown in Fig. 1 an inclosing cover 18 of stiff paper, corrugated board, of other suitable material, is wrapped around the container and secured in place by a cord or other suitable means.

The container of Figs. 3 and 4 is similar in form, size and arrangement of parts but differs in material, the head being made of thin board or rather heavy cardboard and the strips of any suitable form of thin cardboard, or thick paper such as cartridge paper, the necessary stiffness being afforded by the reinforcing pieces 20, which are desirably made of wood and glued to the strips 6, but may be made of other suitable material and secured by other suitable means. Where such reinforcing pieces are used the strips may be made lighter and thinner. Here the seats are also in the form of notches, but they might be otherwise formed.

In the detail form of Figs. 1 and 2, it will be evident that the wires are detachably secured to the heads so that they may be shipped knocked down and flat in quantities to the user where they may be easily assembled, but in Figs. 3 and 4 I have illustrated a special knock-down arrangement, which may be used if desired. There are four strips, the usual number, and these are creased at 22 near their ends forming ears 23 which are secured to the heads so that the latter may swing on the strips as on hinges. As shown in Figs. 3 and 4 two opposite strips are permanently secured to the heads at both ends as by staples or tacks; the other two strips are permanently secured to one of the heads only. Any suitable means are provided for detachably securing their other ends to the other head, for example, slots 24 for the ears 23. When the containers are shipped they are flat as shown in Fig. 4, but when to be used the heads are turned parallel and the two ears inserted in the slots, in the position shown in Fig. 3.

While I do not intend to limit myself to any particular form or size of container, number of parts or arrangement thereof or materials, for in all those particulars the container may be much modified without departing from the spirit of my invention, yet I will describe why the detail structure shown in the drawings is desirable.

The heads may be of different forms and also the supports, but I prefer to make the heads substantially circular and the container substantially cylindrical for that shape will contain the greatest number of eggs in the minimum space and it is the most convenient for handling and for wrapping in the cover. This form like a reel may be rotated while the rope of eggs is being packed and need not be unpacked until the eggs are to be used. In case of the purchaser of a limited number from the retailer, the rope may be unwound and a fraction of the dozen cut off if desired.

Next as to size. I do not limit myself to any particular size of container for they may be made longer or of greater diameter as will be described, but it will be obvious that the size of the container will be controlled by the number of eggs it is to contain, for instance the containers above described for one dozen eggs will not vary much from about $5\frac{1}{2}$ inches in diameter and from 6 to $6\frac{1}{2}$ inches in length. As for the number of strips, I do not limit myself, but four is a desirable number, set at 90°, for with the diameter specified the space between the strips set at 90° is just large enough to receive a single egg with its longer axis set transversely without waste space. If three partitions instead of four be tried it will be seen that the diameter of the container is not substantially reduced and yet only three eggs are accommodated in each transverse tier instead of four.

In Figs. 5 and 6 is shown an elongated container for three dozen eggs. This is a convenient size and is practically three of the one-dozen size set end to end and made integral. The heads are the same in size but the strips are elongated and intermediate partitions 26 are provided, for additional support and stiffness, dividing the container into three compartments, each containing one dozen eggs. As here indicated, the heads are formed with holes to receive the tips 27 of the strips, and the strips with marginal slots 28 for the partitions.

Figs. 7 and 8 show a container made on the same principle but designed to receive eighteen dozen eggs. It is the same in length as the container of Figs. 5 and 6 but much larger in diameter to receive three series of partitions arranged concentrically. In the inner series there are four strips; in the intermediate, eight; in the outer twelve. So that in one tier, or one plane, there will be supported on the three series of strips two dozen eggs and in each compartment six dozen.

Referring particularly to the containers of Figs. 1 to 4 it will be understood that the eggs are first inclosed one dozen in each envelop, and as there are four eggs in a row, and the distance between the rows, that is between adjacent notches on each strip is greater than between the adjacent eggs in each row, the eggs must be irregularly spaced in the envelop, that is an elongated twist must be left between the fourth and fifth eggs of each rope and between the eighth and ninth. Of course eggs for the outer layers of the container of Figs. 7 and 8 must be differently but appropriately spaced.

The irregular spacing is necessary when the corresponding notches of the various strips are in alinement, that is in the transverse plane, but the notches may be set out of alinement each slightly in advance of the corresponding notch on the preceding strip, so that the entire series of notches will form a spiral, each notch in all cases equi-distant from the adjacent notches, and thus permit all the eggs of the rope to be equally spaced, rendering unnecessary the irregular spacing shown.

Generally speaking the cover will be wrapped around both the strips and the heads, and as a matter of course the outer edges of the strips will be substantially in line with the edges of the heads, but in Fig. 1 the cover is arranged to fall just within the outer edges of the heads so that it acts as a longitudinal stiffener. In Fig. 6 is shown at 30 a central compression member or supplemental stiffener. Wire strips may of course be used in connection with this compression member and the wires may be made very light, so that substantially all the stiffening will be done by this member 30. There are modifications in the stiffening means, before referred to, which may be used if and where desired.

Referring particularly to Fig. 8, the outer strips are inserted laterally in the open marginal slots 28, but the inner strips must be inserted longitudinally through the closed slots 31, and, when in position, moved laterally so that the slots in the strips will engage with the heads and with the partitions.

Having thus described my invention I claim,

1. A receptacle for eggs comprising an elongated envelop of yielding material to receive a series of eggs longitudinally arranged, said envelop being twisted between the eggs and at each end, a plurality of supports adapted to receive the twisted portions and means firmly to sustain said supports, the latter being arranged to radiate in various directions from a longitudinal axis to uphold the envelop inclosing the eggs, said envelop being coiled around the supports substantially transversely to the axis.

2. A receptacle for eggs comprising an elongated envelop of yielding material to receive a series of eggs longitudinally arranged, said envelop being twisted between the eggs and at each end a plurality of supports adapted to receive the twisted portions, the supports being arranged to radiate in various directions from a longitudinal axis to uphold the envelop inclosing the eggs at a suitable distance from the axis and coiled around the supports transversely to the axis, and an external protective covering to inclose the receptacle.

3. A receptacle for eggs comprising an elongated envelop of yielding material to receive a series of eggs longitudinally arranged, said envelop being twisted between the eggs and at each end, and a plurality of supports adapted to receive the twisted portions, the supports being arranged to radiate in various directions from a longitudinal axis to uphold the envelop inclosing the eggs at a suitable distance from the axis and in coiled position around the supports transversely to the axis.

4. A receptacle for eggs comprising an elongated envelop of yielding material to receive a series of eggs longitudinally arranged, said envelop being twisted between the eggs and at each end, a plurality of supports adapted to receive the twisted portions and means firmly to sustain said supports, the latter being arranged to radiate about a longitudinal axis to uphold the envelop inclosing the series of eggs in coiled position around the supports and substantially transversely to the axis, the supports being arranged at equal distances from each other and at such distances as freely to receive an egg, with its longer axis extending transversely, between adjacent supports.

5. In a transporting receptacle for a series of eggs, the combination with an envelop of yielding material to receive the eggs, of a container comprising a plurality of suitable supports and means firmly to sustain the supports in position, said supports being arranged around the central axis of the container and spaced therefrom to maintain the eggs around the axis and at a distance therefrom.

6. A transporting container for a series of eggs comprising a plurality of heads, and a series of supports extending between the heads, said supports being arranged around the container axis, and each at a suitable distance therefrom to maintain the eggs spaced from the axis.

7. A transporting container for eggs comprising end heads arranged substantially parallel, a plurality of supports extending between the heads, said supports being arranged parallel to and radiating from the longitudinal axis of the container to sustain the eggs spaced from said axis, and an external protective covering.

8. In a transporting receptacle for eggs, the combination with an envelop to receive the eggs arranged longitudinally, of a container comprising corresponding heads arranged substantially parallel and a series of supports extending between the heads and arranged to radiate from the longitudinal axis of the container, said supports being positively but detachably connected to the heads and being provided with seats on their outer edges to receive the portions of the envelop between the eggs and carry the eggs spaced from the axis.

9. In a transporting receptacle for eggs, the combination with an envelop of yielding material to receive the eggs arranged longitudinally and having twisted portions between the eggs, of a container comprising a plurality of corresponding heads and a plurality of series of supports extending between the heads, each support being provided with seats to receive the twisted portions of the envelop, the supports of each series being equidistant from the longitudinal axis of the container and each series of supports being concentric with the other series.

10. In a transporting receptacle for eggs, the combination with an envelop of yielding material to receive the eggs arranged longitudinally and having twisted portions between the eggs, of a container comprising a pair of similar, circular disks, forming the heads one at each end, a plurality of series of supports extending between the heads and secured thereto, intermediate reinforcing partitions suitably arranged between the heads, and an external protecting covering, said supports being provided with seats to receive the twisted portions, the supports of each series being equidistant from the longitudinal axis of the container, and the supports of each series being concentric with the supports of the other series.

11. In a transporting receptacle for a series of eggs, the combination with an envelop of yielding material to receive the articles arranged longitudinally and having twisted portions between the articles, of a container comprising a plurality of corresponding heads arranged parallel and a series of supporting elements extending between the heads and secured thereto, said elements being arranged substantially parallel to the longitudinal axis of the container and equally spaced from each other and radiating from said axis, said elements being provided with a plurality of retaining means to receive and retain the twisted portions of the envelop, said means being equally spaced along each element.

12. In a transporting receptacle for a series of eggs, the combination with an envelop of flexible or yielding material to receive the articles arranged longitudinally and having twisted portions between the articles, of a container comprising a plurality of corresponding heads arranged parallel and a series of supporting elements extending between the heads and secured thereto, said elements being arranged substantially parallel to the longitudinal axis of the container and equally spaced from each other and radiating from said axis, each of said elements being provided with a plurality of depressions to receive and retain the twisted portions of the envelop, said depressions being equally spaced along each element and the corresponding retaining means on the various elements being substantially in the same plane, transverse to the axis.

13. In a transporting receptacle for a series of eggs, the combination with an envelop of flexible material to receive the eggs arranged longitudinally and having twisted portions at each end and between the eggs, of a container comprising a plurality of corresponding heads arranged parallel, a series of supporting elements extending between the heads, and intermediate supporting partitions for the said elements arranged at intervals between the heads, said elements being arranged substantially parallel to the longitudinal axis of the container and at equal distances from each other, and radiating from the central longitudinal axis of the container, each of said elements being provided with a plurality of retaining means to receive and retain the twisted portions of the envelop, said means being equally spaced along each element.

14. In a transporting receptacle for a series of eggs, the combination with an envelop of yielding material to receive the eggs arranged longitudinally and having twisted portions at each end and between the eggs, of a container comprising a pair of corresponding heads arranged parallel and a series of supporting elements extending between the heads and secured thereto, said elements being arranged substantially at a right angle to the heads and at equal spaces from each other and radiating from the central longitudinal axis of the container, each of said elements being provided with a plurality of seats to receive and retain the twisted portions of the envelop, said seats being equally spaced along each element.

15. In a transporting receptacle for a serise of eggs, the combination with an envelop of flexible material to receive the eggs arranged longitudinally and having twisted portions between the eggs, of a container comprising corresponding heads and a series of supports extending between the heads, said supports being arranged to radiate from the longitudinal axis of the container at equal distances therefrom and being provided with depressed seats to receive the twisted portions and to carry the eggs at a distance from said axis but within the periphery of the heads.

16. A cylindrical container for eggs comprising a frame composed of similar heads, a plurality of stiffening strips having their ends detachably attached to the heads, said strips being radially arranged and spaced at equal distances from each other and having inwardly extending notches at regular intervals, and intermediate supporting partitions similar in form to the heads arranged at equal intervals therebetween.

17. In a cylindrical receptacle for eggs, the combination with a longitudinal envelop of flexible material to receive the eggs and having twisted portions between the eggs, of a container comprising a pair of similar, circular, thin metal heads arranged one at each end of the container, a series of stiffening wires extending between the heads and detachably secured at each end to each head, said wires being equally spaced around the periphery of the container and each wire being corrugated in a plane extending radially from the longitudinal axis of the container to form notches inwardly extending to receive the intermediate twisted portions of the envelop, the outer edges of the wires being substantially in line with the edges of the heads, stiffening disks similar in size to the heads arranged one outside of each head, means to secure each disk to its head, and a wrapper to be arranged around the container and means to secure the wrapper in place, substantially as described and shown.

18. A cylindrical container for eggs comprising a pair of similar, circular heads arranged one at each end of the container and a series of stiffening wires extending between the heads and detachably secured at each end to one head, said wires being equally spaced around the periphery of the container and each wire being radially corrugated to form notches inwardly extending, substantially as described and shown.

19. In a transporting receptacle for eggs, the combination with a longitudinal envelop of yielding material to receive the eggs and having twisted portions between the eggs, of a container comprising a pair of similar, circular, thin heads arranged one at each end of the container, a series of stiffening wires extending between the heads and detachably secured at each end to each head, said wires being equally spaced around the periphery of the container and each wire being corrugated in a plane extending radially from the longitudinal axis of the container to form notches inwardly extending to receive the intermediate twisted portions of the envelop, a wrapper to be arranged around the container and means to secure the wrapper in place, substantially as described and shown.

20. In a transporting receptacle for a series of eggs, the combination with an envelop of yielding material to receive the eggs arranged longitudinally and having twisted portions between the eggs, of a container comprising corresponding heads, and a plurality of series of supports extending between the heads, the supports of each series being substantially equidistant from the longitudinal axis of the container, and the supports of each series being concentric with the supports of the other series.

In testimony whereof I have signed my name to this specification in the presence of two subscribing witnesses.

IRA A. MILLIRON.

Witnesses:
H. A. DUNKLE,
PAUL CUNO.

Copies of this patent may be obtained for five cents each, by addressing the "Commissioner of Patents, Washington, D. C."